April 1, 1930.  O. P. TIEMANN  1,752,513
SEED CORN TESTING LABORATORY
Filed May 14, 1927  5 Sheets-Sheet 1

INVENTOR
Otto P. Tiemann
PER
ATTORNEYS

April 1, 1930.　　　　O. P. TIEMANN　　　　1,752,513
SEED CORN TESTING LABORATORY
Filed May 14, 1927　　　5 Sheets-Sheet 2

INVENTOR
Otto P. Tiemann
PER
Tefft and Tefft
ATTORNEYS

April 1, 1930.   O. P. TIEMANN   1,752,513
SEED CORN TESTING LABORATORY
Filed May 14, 1927   5 Sheets-Sheet 3

April 1, 1930.  O. P. TIEMANN  1,752,513
SEED CORN TESTING LABORATORY
Filed May 14, 1927  5 Sheets-Sheet 4
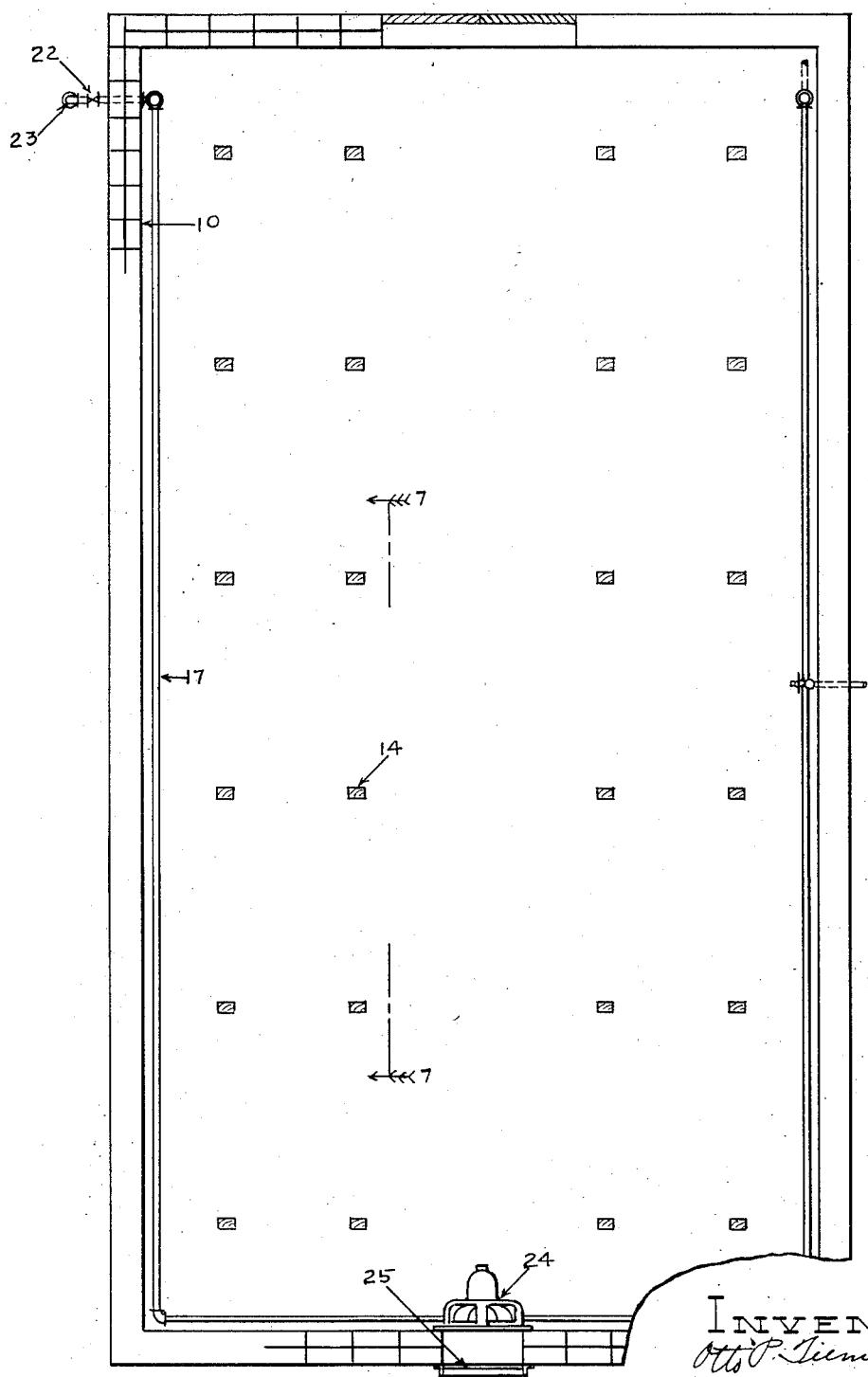

April 1, 1930. O. P. TIEMANN 1,752,513
SEED CORN TESTING LABORATORY
Filed May 14, 1927 5 Sheets-Sheet 5
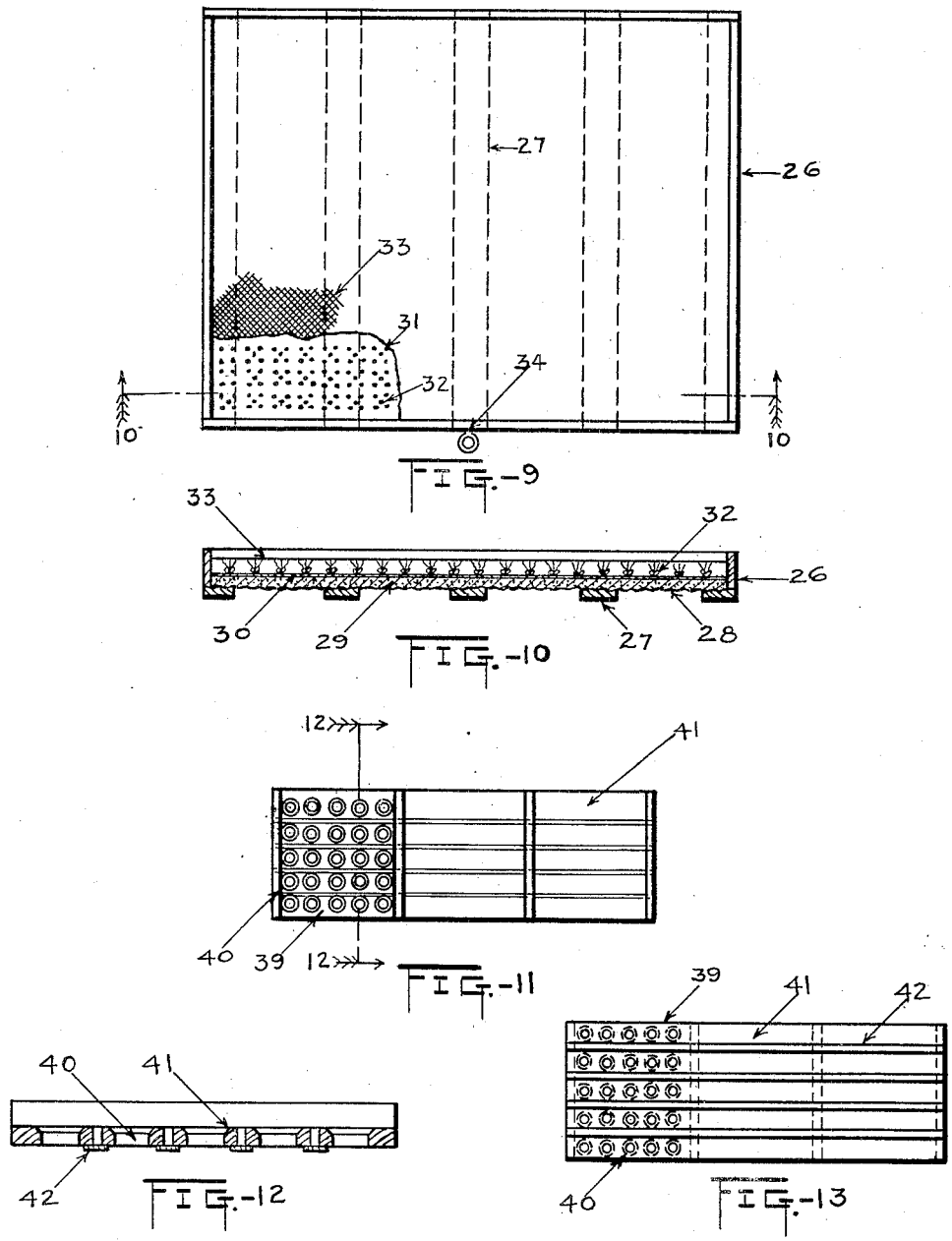

Patented Apr. 1, 1930

1,752,513

UNITED STATES PATENT OFFICE

OTTO P. TIEMANN, OF BLOOMINGTON, ILLINOIS

SEED-CORN-TESTING LABORATORY

Application filed May 14, 1927. Serial No. 191,309.

This invention relates to seed corn testing laboratories.

One of the objects of the invention is in the provision of a laboratory for testing seed corn for the purpose of determining whether the corn is disease free.

Another object is in the provision of a laboratory for testing seed corn, said laboratory being equipped to germinate a very large quantity of seed corn within a period of approximately seven days, at which time said seed corn, or rather the sprouts therefrom are in proper condition to be examined by an expert, whereupon it may be determined whether said corn is diseased or free from disease, and therefore desirable for planting.

Still another object lies in the provision of a seed corn testing laboratory of such design as will permit the germination of a large amount of seed corn under the most favorable conditions for the purpose of deciding whether same is free from defects, said laboratory including a plurality of tray members upon which the kernels are placed, said trays being fashioned in a manner to expedite the germination of the corn, the laboratory itself containing such temperature control and humidity control devices as will greatly assist in the germination of the corn.

A further object lies in the provision of a seed corn testing laboratory containing means for housing and germinating a large amount of seed corn, as well as mechanism for expediting the germination thereof, said laboratory also including mechanism permitting ease in handling and maintaining the corn and tray members upon which same are germinated during the period of germination.

A still further object lies in the provision of a seed corn testing laboratory built in a manner to germinate the corn in a remarkably short time, said means including an automatic mechanism adapted to maintain a substantially even temperature within the laboratory during the germination period, and one which is most efficient for the germination of the large amount of seed corn contained therein.

Yet a further object lies in the provision of a seed corn testing laboratory containing a large number of trays upon which the kernels are placed during the germinating period, said trays being fashioned in a manner to retain and absorb water which is intermittently sprayed thereon and to assist materially in the speedy germination of the kernels to a point where they may be examined by an expert.

Other objects will appear in the following specification, taken in connection with the annexed drawings, in which—

Fig. 8 is a plan view showing the general arrangement of the seed corn testing laboratory with respect to the interior;

Fig. 9 is a plan view of one of the trays following the placing of the kernels and prior to germination;

Fig. 10 is a cross-sectional view on the line 10—10 of Figure 9, showing the complete tray following the germination of the corn, when same is in condition to be examined by the expert;

Fig. 11 shows an auxiliary member adapted to be used in connection with the trays when the kernels are placed thereon;

Fig. 12 is a sectional view taken on the line 12—12 of Fig. 11, and

Fig. 13 is a plan view of Fig. 11.

Applicant is aware of the fact that the germination of other seeds, as well as seed corn, for the purpose of discovering disease, is old, but in order to render a service to the farmer he feels that he has devised a novel laboratory arrangement which permits the practical use of such knowledge, and not merely a laboratory of the ordinary type, but one in which the farmer's entire volume of seed corn may be quickly tested and the results immediately sent to the farmer.

Before describing the laboratory itself, it might be said that the farmer forwards thereto all of his seed corn in the ear in sacks. The laboratory thereupon tests every ear of corn which the farmer has sent in and by the unique manner of handling the corn in the laboratory, as well as in the final examination thereof, is able to advise definitely as to each ear of corn, and to separate same in a simple manner as respects the grading, this grading consisting of the ears which are disease free and one hundred percent strong in germination, those ears which are nearly disease free and one hundred percent strong in germination, and finally, the badly diseased corn which is therefore not used by the farmer for seed corn purposes.

Applicant has his laboratory in a large building, the same being set up on the floor thereof and connected directly with a heating system, which permits the desired amount of heat to be transmitted to the laboratory. However, it may be stated that there is no necessity of locating the laboratory within another building, but same may be, with a lesser degree of efficiency, as will be later pointed out, formed as a building itself.

Figure 1:
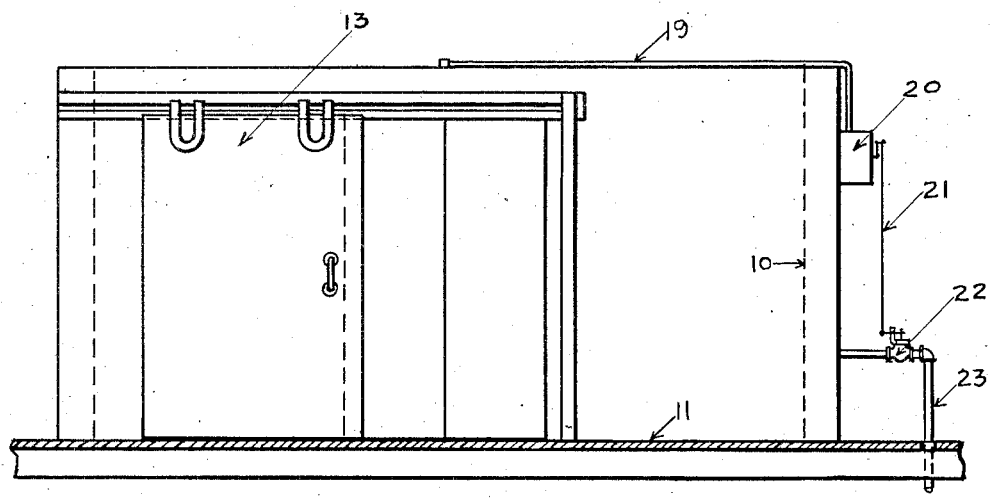
Fig. 1 is a front elevation of my seed corn testing laboratory.
Figure 2:
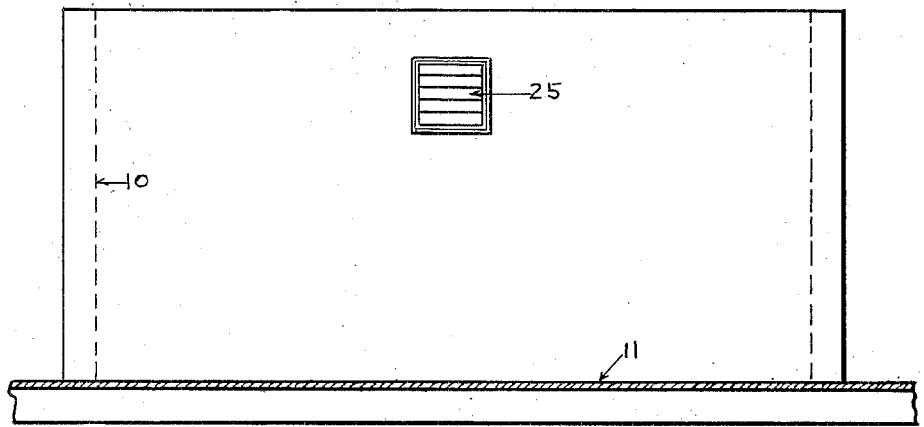
Fig. 2 is a rear elevation thereof.
Figure 3:
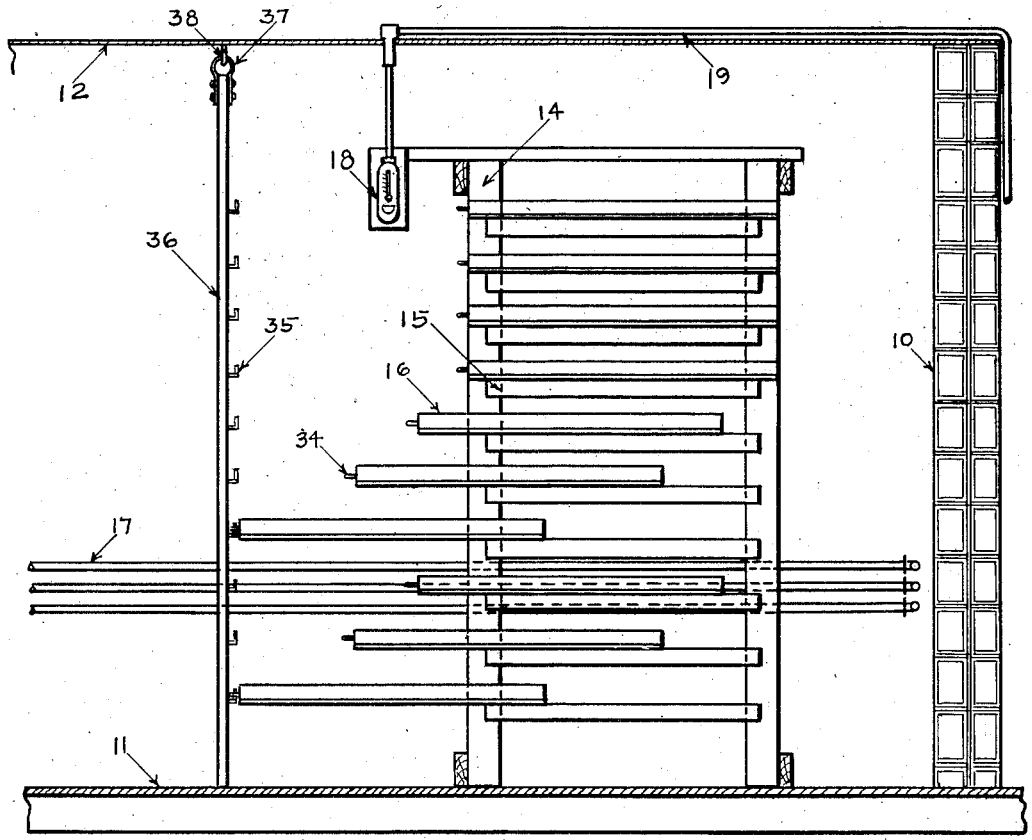
Fig. 3 is a cross-sectional view of one side of the laboratory on the line 3—3 of Figure 6.

In the drawings, in Fig. 1, there is shown a front elevation of the laboratory which is approximately twenty by forty feet. The outer walls of same are formed of double tile, the same being designated 10. This double tile wall construction, due to a careful cementing of the tile, provides an excellent heat insulating wall between the exterior and interior of the laboratory. It is highly desirable that the laboratory be sealed in the manner set forth, or by a substantially similar construction. As a matter of fact, the floor 11 of the laboratory is of metal covered by wood, or any other covering that may be desirable. The roof of the laboratory is shown at 12. The sliding doors 13 are so arranged with respect to the interior of the laboratory as to seal same in a positive manner. As a matter of fact, there is a double door arrangement, which absolutely insures the sealing of the laboratory against the exterior temperature, it being understood that during the germinating period, for the most efficient results, a substantially even temperature must be maintained at all times.

The interior apparatus of the laboratory comprises a series of upright posts 14, connected by a plurality of longitudinally disposed members 15, which, as may be clearly seen in the various views, support a plurality of trays 16, disposed one above the other. There is sufficient spacing of the trays to permit the temperature to permeate the entire laboratory and to be equally divided upon each of the trays and every portion of each tray.

Figure 7:
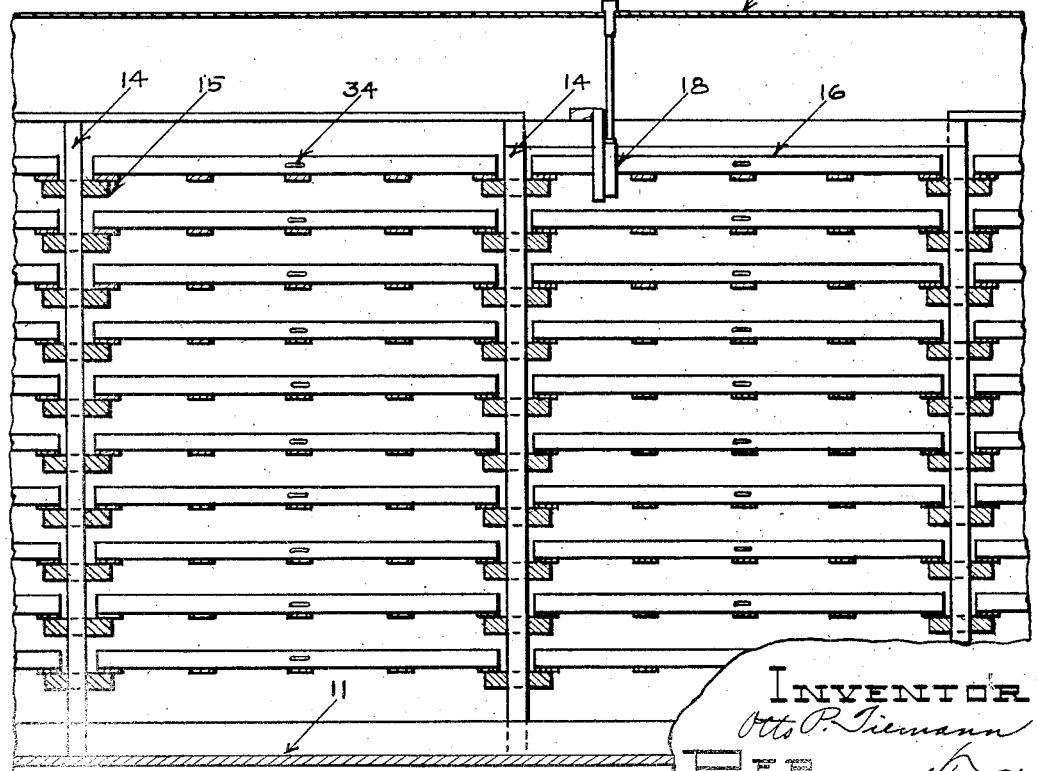
Fig. 7 is a front elevation on the line 7—7 of Figure 8 showing a portion of the plural tray members.

As may be seen in Fig. 7, there are shown two stacks, each containing a large number of trays superposed one above the other. Only a portion of the trays have been shown, in view of the obvious duplication.

Means for heating the laboratory is provided in steam pipes 17, which entirely surround the interior of the laboratory in a manner to apply an even heat to all parts thereof.

As has been stated before, there is an absolute necessity of maintaining an even temperature, which should be between eighty five and ninety degrees. In order to maintain this even temperature, applicant provides a conventional thermostat 18, which is connected by means of wiring disposed in the insulating tube 19, with a relay 20 of well known construction, which in turn, through a connecting lever 21, controls a conventional valve 22 disposed in the steam pipe 23. It is obvious that the thermostat 18 controls the entrance of steam heat into the interior of the laboratory, and therefore insures the maintenance of the laboratory at any desired temperature, and with a variance of a very few degrees.

It might be stated at this time that although steam heat has been used in the present laboratory, obviously any other system of heating might be similarly used, and a temperature control means provided for maintaining same at the desired temperature, which, as stated before, should be between eighty five and ninety degrees.

The regulation of the temperature is obviously of importance. However, it is also important that the humidity of the laboratory be maintained at a desired degree, and in order to control the humidity, an electric fan 24 is disposed at one end of the laboratory and is connected with a shutter arrangement 25 disposed in the opening in the rear wall. In order to maintain an even humidity, the air within the laboratory is changed intermittently during the period of germination, thereby assisting materially in expediting the germination of the seed corn and in an efficient manner. In the winter when the outside air is very cold the shutters adjacent to the fan may be closed or nearly closed, so that only a very little of the cold air enters at a time. This shutter arrangement, together with the thermostatically controlled heating arrangement, prevents the temperature of the laboratory from falling below the required degree. Thus the temperature can be kept substantially between 85° and 90° F. even in the coldest weather.

The trays, generally described as 16, are perhaps best shown in Fig. 10. These trays comprise the side and end portions 26 of substantially three inches in height. Plural supporting members 27 are shown carrying the actual bottoms of the trays, which comprise a copper fly screen 28 for each tray. Disposed above the screen 28 is a sawdust mixture, sprinkled with lime, which mixture has been designated 29. Covering the mixture of sawdust and lime is a heavy muslin 30, upon which are disposed the kernels 31, in piles usually of five and spaced in an equidistant manner, as shown in Fig. 9. These piles of kernels have been designated 32. Covering the kernels is a second and lighter muslin 33, the same being laid over the kernels when the trays are first placed within the laboratory and maintaining such position throughout the germination period.

It might be stated at this time that intermittently throughout the germinating period, each tray is sprinkled with water, sprayed upon the upper muslin cover, thereby dampening same. The main volume of moisture, however, passes through the muslin and not only moistens the lower muslin, but, due to the fact that said muslin is heavier than the upper one, the moisture is maintained therein considerably longer than it is in the first and lighter muslin. Obviously, a large portion of water passes into the sawdust and lime mixture.

This placing of the lighter muslin over the heavier one adds greatly to the efficiency of the germination of the seed corn, in that moisture is transmitted in a substantially even manner to the kernels, which would not be possible if the muslin were of a heavier grade and permitted the collection of the water in pools at various points thereon.

In Figure 10, the kernels are shown in a sprouted condition. However, the actual sprouting ordinarily takes about seven days, this being the most efficient sprouting period and immediately following such sprouting the expert may remove the trays to a point outside the laboratory and examine the sprouts and separate the kernels in the three grades previously mentioned.

As stated before, intermittently throughout the germinating period, the trays are watered, and in order to assist in this operation, each of the plural trays has an eye 34, screwed into its front end, said eye being adapted to engage hooks 35 disposed at corresponding heights on a detachable upright member 36, which in turn has an eye 37 upon its upper end adapted to engage any of a plurality of hooks 38 attached to the ceiling of the laboratory. This upright member 36 has a removable attachment with hook 38 and may be manually moved to a position adjacent the trays, whereupon the latter may be pulled out and hooked to their corresponding hooks, and may then be readily sprinkled with water by a convenient hose member, connected with any suitable water supply. The above arrangement provides an efficient means for handling the heavy trays and expedites the watering operation.

In Figs. 11, 12 and 13 of the drawings there has been shown an auxiliary board 39, having a plurality of equidistantly disposed apertures 40 therein, the board being adapted to be placed upon the trays and the kernels placed in the apertures in a manner to space same efficiently upon the trays. Inasmuch as it is necessary to have knowledge at all times of exactly where each ear of corn is located, not only upon the tray but in the laboratory as well, this board provides not only a ready means for placing the kernels upon the trays, but also for assisting in locating each kernel of each ear. It is obvious that the ears themselves are stored without the laboratory and only a few kernels from each ear are actually germinated therein.

The board 39 is formed of a plurality of strips 41, connected at their lower sides by the flexible portions 42.

Figures 4, 5:
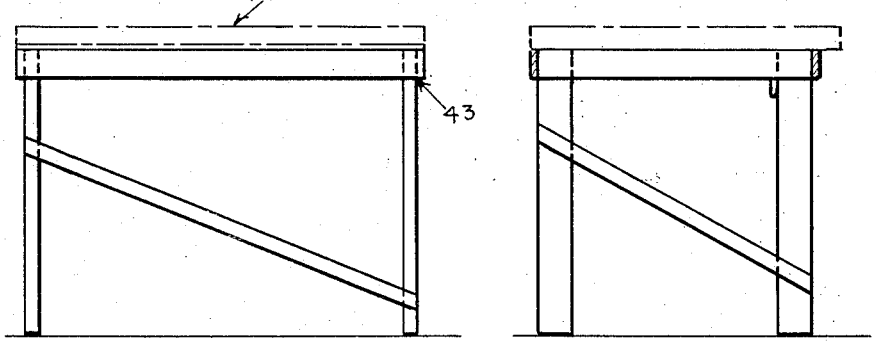
Fig. 4 is a front elevation showing one of the trays disposed upon a table member when in the process of examination.
Fig. 5 is an end elevation of Fig. 4.
Figure 6:
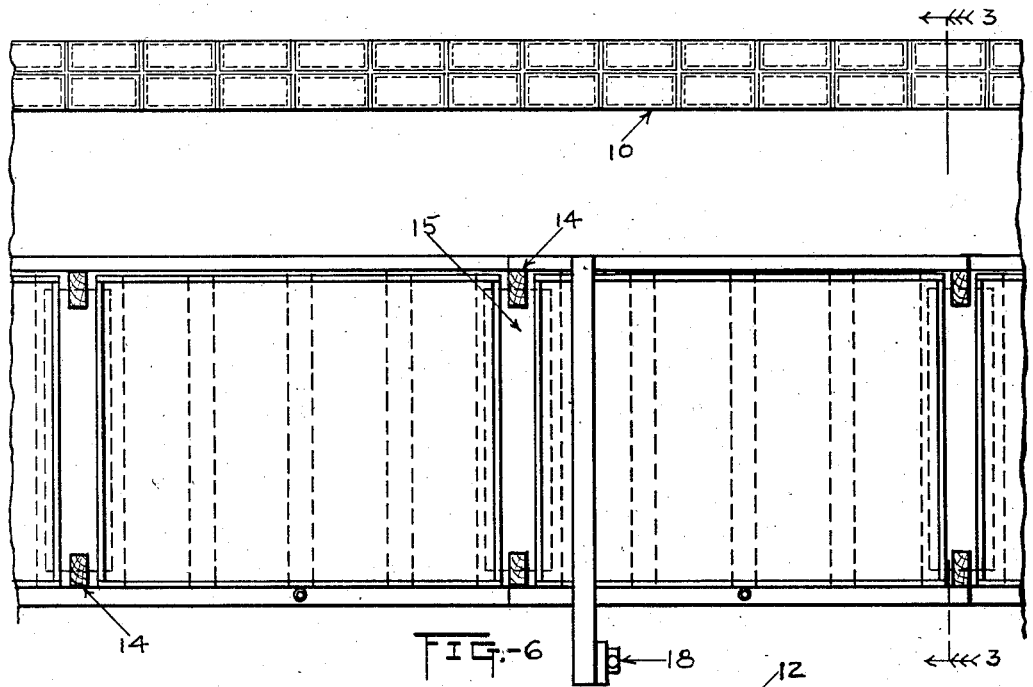
Fig. 6 is a plan view showing the arrangement of the plural tray members.

In Figs. 4 and 5, are shown auxiliary table members 43, adapted to be located outside of the laboratory and to provide convenient means upon which the trays may be placed, either for the purpose of receiving kernels from the ears of corn, or for the purpose of examination of the sprouts of the germinated kernels by the expert.

As respects the operation of the seed corn testing laboratory, same is thought to have been clearly set forth throughout the description of the structural features. However, it is apparent that kernels from each ear of the farmer's seed corn supply are placed upon the trays and above the heavy muslin 31, whereupon the trays are placed within the laboratory and intermittently sprinkled by an operator throughout the germinating period, which is approximately seven days. The temperature within the laboratory is maintained evenly by means of the thermostat and the humidity is also regulated by the intermittent operation of the electric fan.

The above provides a most efficient germinating method, whereafter the trays are removed, the kernels in sprouted condition are examined and the operator is able to grade the corn in such manner that the farmer may discard the diseased ears. This service, due to the efficiency of the above described laboratory, may be rendered at a remarkably low price, and the farmer is able to increase his crop return from fifteen to twenty five percent.

What I claim is:

1. In a seed corn testing laboratory comprising a compartment sealed in a manner to maintain a substantially constant high temperature therein and having temperature control means therefor; a support in said compartment, a plurality of seed germinating trays disposed as a stack one above the other on said support in a manner to permit withdrawal thereof for the purpose of applying water thereto, and a rigid upright member adapted to be detachably fixed opposite said stack and having portions adapted to engage a plurality of said seed germinating trays when withdrawn to thereby cooperate with said support in maintaining the trays in upright position.

2. Apparatus for testing seed corn, comprising a support, a plurality of trays carried by said support and spaced vertically from each other to permit the passage of air therebetween, said trays having foraminous bottoms and being normally in vertical alinement to form a stack but slidably movable on said support to abnormal positions for inspection and watering, and a rigid upright member adapted to be detachably fixed opposite said stack to simultaneously engage a plurality of said trays and thereby cooperate with said support in supporting the trays in said abnormal positions.

3. A method of testing seed corn, which comprises subjecting the seeds to a substantially constant temperature of about 85° to 90° F., intermittently applying water thereto, passing heated air above and below said seeds, and periodically renewing the heated air.

In testimony whereof I have hereunto affixed my signature.

OTTO P. TIEMANN.